Patented Sept. 15, 1953

2,652,400

UNITED STATES PATENT OFFICE 2,652,400

2,2'-(2,5-LOWER DIALKOXY-p-PHENYLENE)-DI-(ANTHRA[2,1]THIAZOLE-6,11-DIONES)

Nicholas W. Solonen and David I. Randall, Easton, Pa., assignors to General Aniline & Film Corporation, New York, N. Y., a corporation of Delaware No Drawing. Application December 7, 1951, Serial No. 260,583

6 Claims. (Cl. 260—303)

This invention relates to vat dyestuffs and particularly to 2,2'-(2,5-lower dialkoxy-p-phenylene)-di-(anthra[2,1]-thiazole-6,11-diones).

It is an object of the present invention to provide 2,2'-(2,5-lower dialkoxy-p-phenylene)-di-(anthra[2,1]thiazole-6,11-diones) which are useful as vat dyes having exceptional brightness in color and fastness to fabrics.

Other objects and advantages will be apparent from the following specification in which the preferred details and embodiments are described.

The vat dyes of this invention are characterized by a structure corresponding to the general formula:

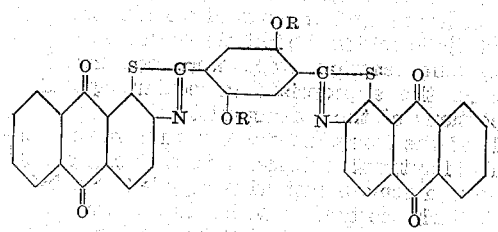

wherein R represents a lower alkyl group, e. g., methyl, ethyl, propyl, isopropyl, butyl, isobutyl, etc.

The vat dyes illustrated by the foregoing formula are obtained in good yields by first reacting a molecular equivalent of a 2,5-lower dialkoxyterephthalic acid with two molecular equivalents of thionyl chloride in the presence of anhydrous o-dichlorobenzene at a temperature ranging from 120 to 145° C. The reaction mixture is maintained with constant stirring at a temperature of about 140° C. for a period of time ranging from 2 to 4 hours. The excess thionyl chloride is distilled off by passing in dry air to the reaction mixture at about 150° C. and the original volume restored by the addition of anhydrous o-dichlorobenzene. The acid chloride solution is filtered and added slowly to two molecular equivalents of 2-amino-1-chloroanthraquinone in a mixture consisting of about 40 parts of anhydrous o-dichlorobenzene and 1 part of pyridine. The acid chloride solution is then heated at 110 to 115° C. for 7 hours, cooled to room temperature and the product, 2,5-lower dialkoxyterephthaloyl-di-(2-amido-1-chloroanthraquinone), filtered, washed with anhydrous o-dichlorobenzene, ethanol, and water, and finally dried.

A molecular equivalent of the above product is added to a mixture consisting of about 16 parts of pyridine, 7 parts of sodium sulfide and 1 part of sulfur. The resulting mixture is heated to about 80 to 95° C. and maintained at this temperature for about 7 to 8 hours. After cooling to room temperature, the product, 2,5-dialkoxyterephthaloyl-di-(2-amido-1-mercapto-anthraquinone), is steam distilled, filtered, washed, and dried.

A molecular equivalent of the mercapto derivative is slowly added to a solution consisting of about 18 parts of 96% sulfuric acid and 1 part of water, the solution heated to about 105° C. and maintained at this temperature with stirring for about 2 to 3 hours. The reaction mixture is cooled to room temperature, poured over ice and water mixture, and the resulting precipitate allowed to stand overnight. The final product is then filtered, washed neutral with water, and dried. All of the parts given above are by weight.

As examples of suitable 2,5-lower dialkoxyterephthalic acids, the following may be mentioned:

2,5-dimethoxyterephthalic acid
2,5-diethoxyterephthalic acid
2,5-dipropoxyterephthalic acid
2,5-dibutoxyterephthalic acid The following examples describe the preparation of some of the 2,2'-(2,5-lower dialkoxy-p-phenylene)-di-(anthra-[2,1]thiazole - 6,11 - diones). All parts given are by weight.

Example I

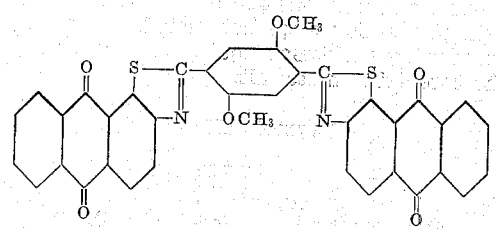

[2,2'-(2,5-dimethoxy-p-phenylene)-di-(anthra[2,1]-thiazole-6,11-dione)]

15 parts of 2,5-dimethoxyterephthalic acid were added to 140 parts of anhydrous o-dichlorobenzene followed by the addition of 20 parts of thionyl chloride, and the resulting mixture gradually brought up to 140° C. The reaction was maintained at this temperature for 3 hours with efficient stirring. At the end of this time, the excess thionyl chloride was distilled out by passing in dry air at 150° C., and the original volume of the reaction mixture restored by the addition of anhydrous o-dichlorobenzene. The acid chloride solution was filtered and added slowly to a solution of 31.2 parts of 2-amino-1-chloro-anthraquinone in 790 parts of anhydrous o-dichlorobenzene and 20 parts of pyridine while the latter was at 110 to 115° C. After the addition of the acid chloride solution was complete, the reaction mixture was maintained at 110 to 115° C. for 7 hours. After cooling to room temperature, the product was filtered, the presscake washed with anhydrous o-dichlorobenzene, ethanol, and water, and then dried.

40 parts of the above product, 2,5-dimethoxy-terephthaloyl - di - (2 - amido-1 - chloroanthra-quinone), were added to a mixture of 216 parts of pyridine, 87 parts of crystalline sodium sulfide and 12 parts of sulfur. The resulting mixture was brought up to 90° C. and maintained at that temperature for about 7 hours. After cooling to room temperature, the product was filtered and the moist presscake steam distilled. The mercapto-derivative was then filtered, washed with water, and dried.

30 parts of 2,5-dimethoxyterephthaloyl-di-(2-amido-1-mercaptoanthraquinone), prepared as above, were slowly added to a sulfuric acid solution composed of 945 parts of 96% sulfuric acid and 52 parts of water. The resulting solution was gradually brought up to 105° C. and maintained at this temperature with stirring for about 2 hours. The reaction was cooled to room temperature and poured into 9550 parts of a mixture of ice and water. After allowing the precipitate to stand overnight, it was filtered, washed neutral with water, and dried.

*Example II*

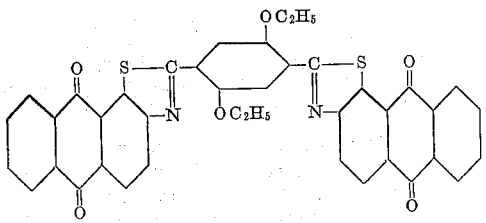

[2,2'-(2,5-diethoxy-p-phenylene)-di-(anthra[2,1]-thiazole-6,11-dione)]

Example I was repeated with the exception that 15 parts of 2,5-dimethoxyterephthalic acid were replaced by 16.8 parts of 2,5-diethoxy-terephthalic acid in the initial reaction and the additional reaction steps conducted by utilizing corresponding molecular equivalent proportions of the coreacting materials.

*Example III*

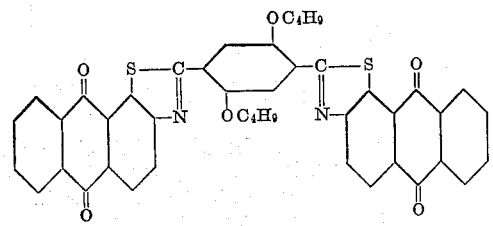

[2,2'-(2,5-dibutoxy-p-phenylene)-di-(anthra[2,1]-thiazole-6,11-dione)]

Example I was repeated with the exception that 15 parts of 2,5-dimethoxyterephthalic acid were replaced by 20.5 parts of 2,5-dibutoxy-terephthalic acid in the initial reaction step. The subsequent reaction steps were conducted by utilizing the appropriate molecular equivalent proportions of the coreactants.

*Example IV*

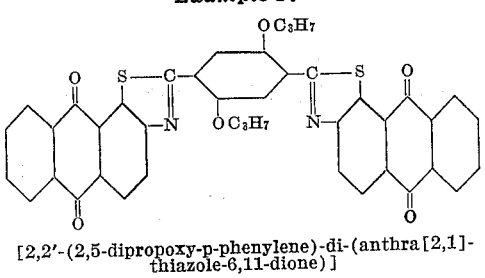

[2,2'-(2,5-dipropoxy-p-phenylene)-di-(anthra[2,1]-thiazole-6,11-dione)]

Example I was repeated with the exception that 15 parts of 2,5-dimethoxyterephthalic acid were replaced by 18.7 parts of 2,5-dipropoxy-terephthalic acid in the initial reaction step. The subsequent reaction steps were conducted by utilizing the appropriate molecular equivalent proportions of the coreactants.

*Example V*

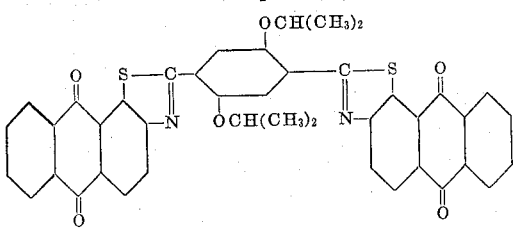

[2,2'-(2,5-diisopropoxy-p-phenylene)-di-(anthra[2,1]-thiazole-6,11-dione)]

Example I was repeated with the exception that 15 parts of 2,5-dimethoxyterephthalic acid were replaced by 18.7 parts of 2,5-diisopropoxy-terephthalic acid in the initial reaction step. The subsequent reaction steps were conducted by utilizing the appropriate molecular equivalent proportions of the coreactants.

All of the foregoing vat dyestuffs have great affinity for textile fabrics, have a strong orange shade and remain fast when applied to fabrics, particularly cotton. While there have been pointed out certain preferred embodiments of the invention, the same is not limited to the foregoing examples or to the specific details given therein, but are capable of variation and modification as to the reactants, proportions, and conditions employed.

We claim:

1. 2,2' - (2,5 - lower dialkoxy-p-phenylene)-di-(anthra[2,1]thiazole-6,11-diones) characterized by the following general formula:

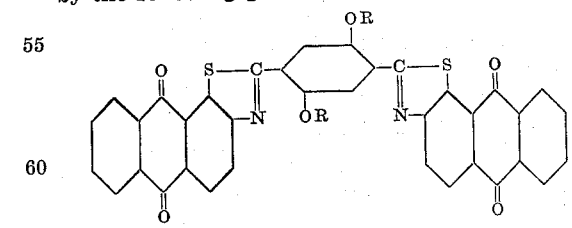

wherein R represents a lower alkyl group.

2. [2,2' - (2,5 - dimethoxy - p-phenylene)-di-(anthra[2,1] - thiazole - 6,11-dione)] having the following formula:

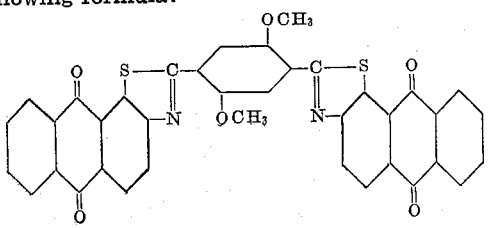

3. [2,2' - (2,5 - diethoxy - p - phenylene)-di-(anthra[2,1]-thiazole-6,11-dione)] having the following formula:

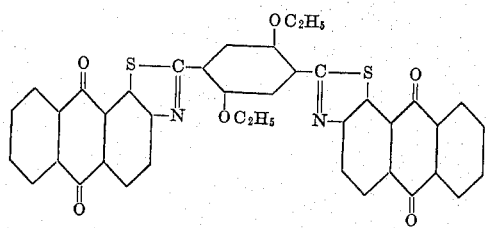

4. [2,2' - (2,5 - dibutoxy - p - phenylene) - di-(anthra[2,1]-thiazole-6,11-dione)] having the following formula:

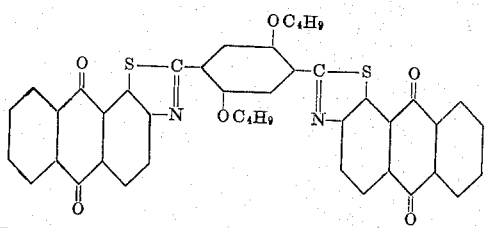

5. [2,2' - (2,5 - dipropoxy - p - phenylene) - di-(anthra[2,1]-thiazole-6,11-dione)] having the following formula:

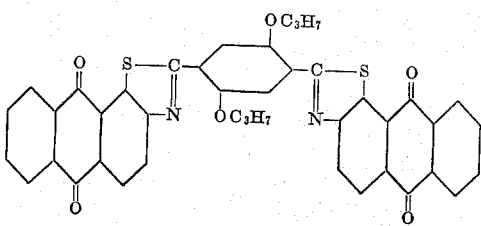

6. [2,2' - (2,5 - diisopropoxy - p - phenylene) - di-(anthra[2,1]-thiazole-6,11-dione)] having the following formula:

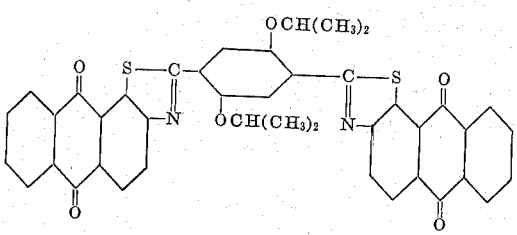

NICHOLAS W. SOLONEN.
DAVID I. RANDALL.

References Cited in the file of this patent

UNITED STATES PATENTS

| Number | Name | Date |
|---|---|---|
| 1,459,536 | Kacer | June 19, 1923 |

FOREIGN PATENTS

| Number | Country | Date |
|---|---|---|
| 101,169 | Switzerland | Sept. 1, 1923 |
| 204,249 | Great Britain | Sept. 27, 1923 |
| 384,674 | Germany | Nov. 8, 1923 |

OTHER REFERENCES

Georgievics, "Dye Chemistry," Scott, Greenwood and Son, London, 1920.